(12) United States Patent
Deng et al.

(10) Patent No.: US 12,505,349 B2
(45) Date of Patent: *Dec. 23, 2025

(54) SELF-PRUNING NEURAL NETWORKS FOR WEIGHT PARAMETER REDUCTION

(71) Applicant: Samsung Electronics Co., Ltd., Suwon-si (KR)

(72) Inventors: Weiran Deng, Woodland Hills, CA (US); Georgios Georgiadis, Burbank, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 1020 days.

This patent is subject to a terminal disclaimer.

(21) Appl. No.: 17/572,625

(22) Filed: Jan. 10, 2022

(65) Prior Publication Data

US 2022/0129756 A1   Apr. 28, 2022

Related U.S. Application Data (63) Continuation of application No. 15/894,921, filed on Feb. 12, 2018, now Pat. No. 11,250,325.

(Continued)

(51) Int. Cl.
*G06N 3/082* (2023.01)
*G06N 3/04* (2023.01)
*G06N 3/084* (2023.01)

(52) U.S. Cl.
CPC ............. *G06N 3/082* (2013.01); *G06N 3/04* (2013.01); *G06N 3/084* (2013.01)

(58) Field of Classification Search
CPC .......... G06N 3/082; G06N 3/04; G06N 3/084; G06N 3/045; G06N 3/0464
See application file for complete search history.

(56) References Cited

U.S. PATENT DOCUMENTS

| | | | |
|---|---|---|---|
| 5,636,326 | A | 6/1997 | Stork et al. |
| 5,812,992 | A | 9/1998 | Vries |

(Continued)

FOREIGN PATENT DOCUMENTS

| | | |
|---|---|---|
| CN | 107369154 A | 11/2017 |
| DE | 19805493 A1 | 8/1999 |

(Continued)

OTHER PUBLICATIONS

Manessi, Franco et al., "Automated Pruning for Deep Neural Network Compression," 24th International Conference on Pattern Recognition (ICPR), 2018, 10 pages.

(Continued)

*Primary Examiner* — Tan H Tran (74) *Attorney, Agent, or Firm* — Renaissance IP Law Group LLP (57) ABSTRACT

A technique to prune weights of a neural network using an analytic threshold function h(w) provides a neural network having weights that have been optimally pruned. The neural network includes a plurality of layers in which each layer includes a set of weights w associated with the layer that enhance a speed performance of the neural network, an accuracy of the neural network, or a combination thereof. Each set of weights is based on a cost function C that has been minimized by back-propagating an output of the neural network in response to input training data. The cost function C is also minimized based on a derivative of the cost function C with respect to a first parameter of the analytic threshold function h(w) and on a derivative of the cost function C with respect to a second parameter of the analytic threshold function h(w).

20 Claims, 9 Drawing Sheets

Related U.S. Application Data (60) Provisional application No. 62/597,908, filed on Dec. 12, 2017.

(56) References Cited

U.S. PATENT DOCUMENTS

| | | | |
|---|---|---|---|
| 6,311,172 | B1 | 10/2001 | Tresp et al. |
| 6,408,227 | B1 | 6/2002 | Singhvi et al. |
| 2006/0112028 | A1 | 5/2006 | Xiao et al. |
| 2006/0195406 | A1 | 8/2006 | Burges et al. |
| 2010/0060350 | A1 | 3/2010 | Zhang et al. |
| 2015/0106316 | A1 | 4/2015 | Birdwell et al. |
| 2015/0278683 | A1 | 10/2015 | Gupta et al. |
| 2016/0143543 | A1 | 5/2016 | Zhang |
| 2016/0162781 | A1 | 6/2016 | Lillicrap et al. |
| 2018/0046915 | A1* | 2/2018 | Sun ................. G06N 3/082 |
| 2018/0114114 | A1* | 4/2018 | Molchanov ........ G06N 3/045 |
| 2019/0130271 | A1* | 5/2019 | Narang ............. G06N 3/082 |
| 2020/0097828 | A1* | 3/2020 | Du ................... G06N 3/082 |
| 2020/0184337 | A1 | 6/2020 | Baker |

FOREIGN PATENT DOCUMENTS

| | | |
|---|---|---|
| EP | 1696345 A2 | 8/2006 |
| JP | 2000507376 A | 6/2000 |
| JP | 2006236345 A | 9/2006 |

OTHER PUBLICATIONS

Final Office Action for U.S. Appl. No. 15/894,921, mailed Jul. 7, 2021.

Khan, Gul Muhammad, et al., "Evolution of Cartesian Genetic Programs for Development of Learning Neural Architecture," Evolutionary Computation, Aug. 2011, 55 pages.

Notice of Allowance for U.S. Appl. No. 15/894,921, mailed Oct. 14, 2021.

Office Action for U.S. Appl. No. 15/894,921, mailed Feb. 9, 2021.

Smith, Steven W., "The Scientist and Engineer's Guide to Digital Signal Processing," Neural Network Architecture, The Scientist and Engineer's Guide to Digital Signal Processing, Chapter 26, 2006, pp. 1-4.

Stepniewski, Slawomir et al., "Pruning Backpropagation Neural Networks Using Modern Stochastic Optimisation Techniques", Neural Computing & Applications, (1997) 5: 76-98, 24 pages.

\* cited by examiner

SELF-PRUNING NEURAL NETWORKS FOR WEIGHT PARAMETER REDUCTION

CROSS-REFERENCE TO RELATED APPLICATION

This application is a continuation of U.S. patent application Ser. No. 15/894,921, filed Feb. 12, 2018, which claims the priority benefit under 35 U.S.C. § 119(e) of U.S. Provisional Patent Application Ser. No. 62/597,908, filed Dec. 12, 2017, the disclosures of which are incorporated herein by reference in their entirety.

TECHNICAL FIELD

The subject matter disclosed herein generally relates to an apparatus and a method that utilizes a threshold function to prune weights of a neural network, and more particularly, to an apparatus and a method to prune weights of a neural network using an analytic threshold function that optimally prunes the weights during back-propagation, thereby enhancing a speed performance of the neural network, an accuracy of the neural network, or a combination thereof.

BACKGROUND

Deep-Learning Neural Networks (DNN) is a technology used for solving, for example, computer-vision-related problems, such as, but not limited to, image classification and object detection. DNNs have a commercial potential for applications, such as autonomous driving, mobile devices and AI software applications. DNNs have a high computational demand that may be an obstacle for deploying DNNs in, for example, handheld devices like smartphones.

Due to the large number of layers in a typical DNN determining optimal weights values for each layer poses a significantly complex task because the various layers are dependent upon other layers within the network. That is, values of the neuronal weights in one layer may be dependent on the values of weights in other layers so that, for example, a greedy layer-wise thresholding approach to prune weights at each layer may be ineffective and may also result in a considerable loss of overall system accuracy.

Accordingly, research has focused on overcoming the high computational demand associated with DNNS and to provide a way to optimally prune weight values of a DNN. One approach for pruning weights has focused on an iterative technique that prunes pre-trained kernel weights and re-trains the network to recover the accuracy that has been lost due to pruning. Iterative pruning, however, is tedious and time-consuming because the iteration process continues until explicit threshold values and weights are empirically found that produce a tolerable accuracy loss.

SUMMARY

An example embodiment provides a neural network that may include a plurality of layers in which each layer may include a set of weights w associated with the corresponding layer that enhance a speed performance of the neural network, an accuracy of the neural network, or a combination thereof, and in which each set of weights may be based on a cost function C minimized by back-propagating an output of the neural network in response to input training data, on a derivative of the cost function C with respect to a first parameter of an analytic threshold function h(w) and on a derivative of the cost function C with respect to a second parameter of the analytic threshold function h(w). The analytic threshold function h(w) may include a value of 0 for a first set of continuous weight values centered around 0, and a value of 1 for a second set of continuous weight values and for a third set of continuous weight values in which the second set of continuous weight values may be different from and greater than the first set of continuous weight values and the third set of continuous weight values may be different from and less than the first set of continuous weight values. The analytic threshold function h(w) may further include a first edge between the first set of continuous weight values and the second set of continuous weight values and a second edge between the first set of continuous weight values and the third set of continuous weight values in which a sharpness of each of the first and second edges between 0 and 1 may be based on a value of the first parameter of the analytic threshold function h(w) and a distance between the first and second edges may be based on a value of the second parameter of the analytic threshold function h(w).

Another example embodiment provides a method to prune weights of a neural network that may include: forming a weight function f(w) for weights w associated with each layer of a plurality of layers of the neural network based on an analytic threshold function h(w), the analytic threshold function h(w) may include a value of 0 for a first set of continuous weight values centered around 0, and a value of 1 for a second set of continuous weight values and for a third set of continuous weight values in which the second set of continuous weight values may be different from and greater than the first set of continuous weight values and the third set of continuous weight values may be different from and less than the first set of continuous weight values, and in which the analytic threshold function h(w) may further include a first edge between the first set of continuous weight values and the second set of continuous weight values and a second edge between the first set of continuous weight values and the third set of continuous weight values, a sharpness of each of the first and second edges between 0 and 1 may be based on a value of a first parameter of the analytic threshold function h(w) and a distance between the first and second edges may be based on a value of a second parameter of the analytic threshold function h(w); inputting training data to the neural network to generate an output based on the training data; back-propagating the output through the neural network; and minimizing a difference between the output and the training data to determine a set of weights w that enhance a speed performance of the neural network, an accuracy of the neural network, or a combination thereof, by minimizing a cost function C based on a derivative of the cost function C with respect to the first parameter and based on a derivative of the cost function C with respect to the second parameter.

Still another example embodiment provides a neural network that may include a plurality of layers, in which each layer may include a set of weights w associated with the layer that enhance a speed performance of the neural network, an accuracy of the neural network, or a combination thereof, each set of weights may be based on a cost function C that has been minimized by back-propagating an output of the neural network in response to input training data, on a derivative of the cost function C with respect to a first parameter of an analytic threshold function h(w) and on a derivative of the cost function C with respect to a second parameter of the analytic threshold function h(w), in which the analytic threshold function h(w) may include a value of 0 for a first set of continuous weight values centered around 0, and a value of 1 for a second set of continuous weight values and for a third set of continuous weight values in which the second set of continuous weight values may be different from and greater than the first set of continuous weight values and the third set of continuous weight values may be different from and less than the first set of continuous weight values, and in which the analytic threshold function h(w) may further include a first edge between the first set of continuous weight values and the second set of continuous weight values and a second edge between the first set of continuous weight values and the third set of continuous weight values, a sharpness of each of the first and second edges between 0 and 1 may be based on a value of the first parameter of the analytic threshold function h(w) and a distance between the first and second edges may be based on a value of the second parameter of the analytic threshold function h(w).

BRIEF DESCRIPTION OF THE DRAWINGS

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one embodiment, a weight-pruning technique uses an analytic threshold function that optimally reduces the number of weights, thereby increasing performance of a neural network. The analytic threshold function may be applied to the weights of the various layers of the neural network so that weights having magnitudes that are less than a threshold are set to zero and weights that are greater than the threshold are not affected. Additionally, the threshold function is differentiable and parameters of the threshold function may be optimized during back-propagation. The analytic threshold function may be trained concurrently with network weights during back-propagation, thereby avoiding a time-consuming iterative process.

In one embodiment, minimization of a cost function also optimizes the threshold function to produce a threshold function having a relatively wider width and relatively sharper edges, while also providing a neural network having a minimal number of non-zero weights. The cost function may include regularization terms that may optimally minimize certain parameters of the analytic threshold function that results in the threshold function having a relatively wider width and relatively sharper edges. Output values instead of input values of the threshold function may be used for inference.

The optimized weight values generated by the technique disclosed herein have relatively fewer non-zero parameters that obtained using other pruning techniques and thereby uses less memory because fewer multiply and accumulate (MAC) operations are used during inference.

Figure 1:
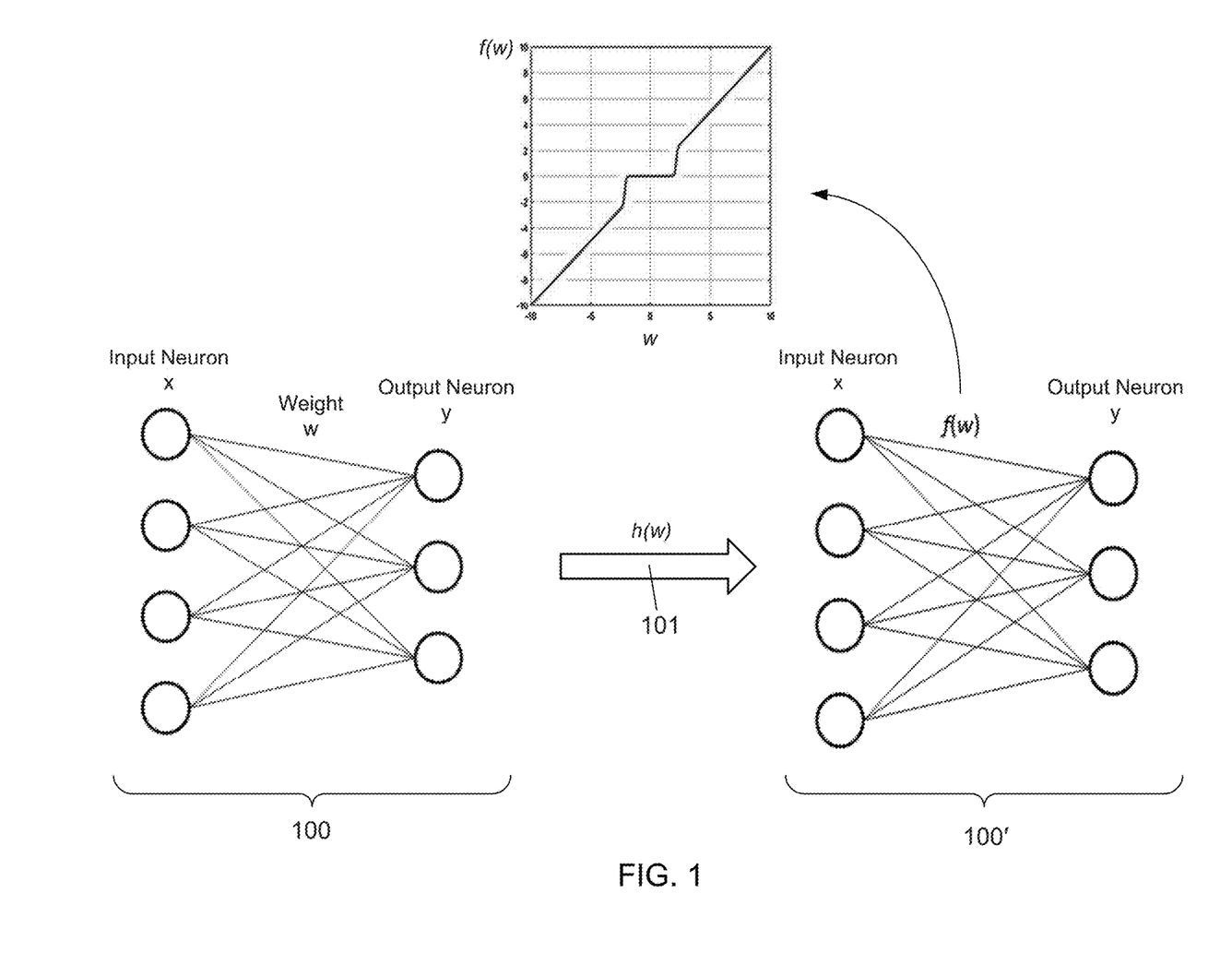
FIG. 1 depicts an example layer in a neural network and application of an analytic threshold function to form an analytic weight function f(w) for optimally pruning the weights of the example layer according to the subject matter disclosed herein.

FIG. 1 depicts an example layer 100 in a neural network and application of an analytic threshold function to form an analytic weight function f(w) for optimally pruning the weights of the example layer 100 according to the subject matter disclosed herein. Regardless of the level of complexity of a neural network that may include the example layer 100, an output neuron y of the layer 100 may be formed as a sum of products of the input neuron x with the connecting weights w to the output neuron, as indicated on the left side of FIG. 1.

Figure 2:
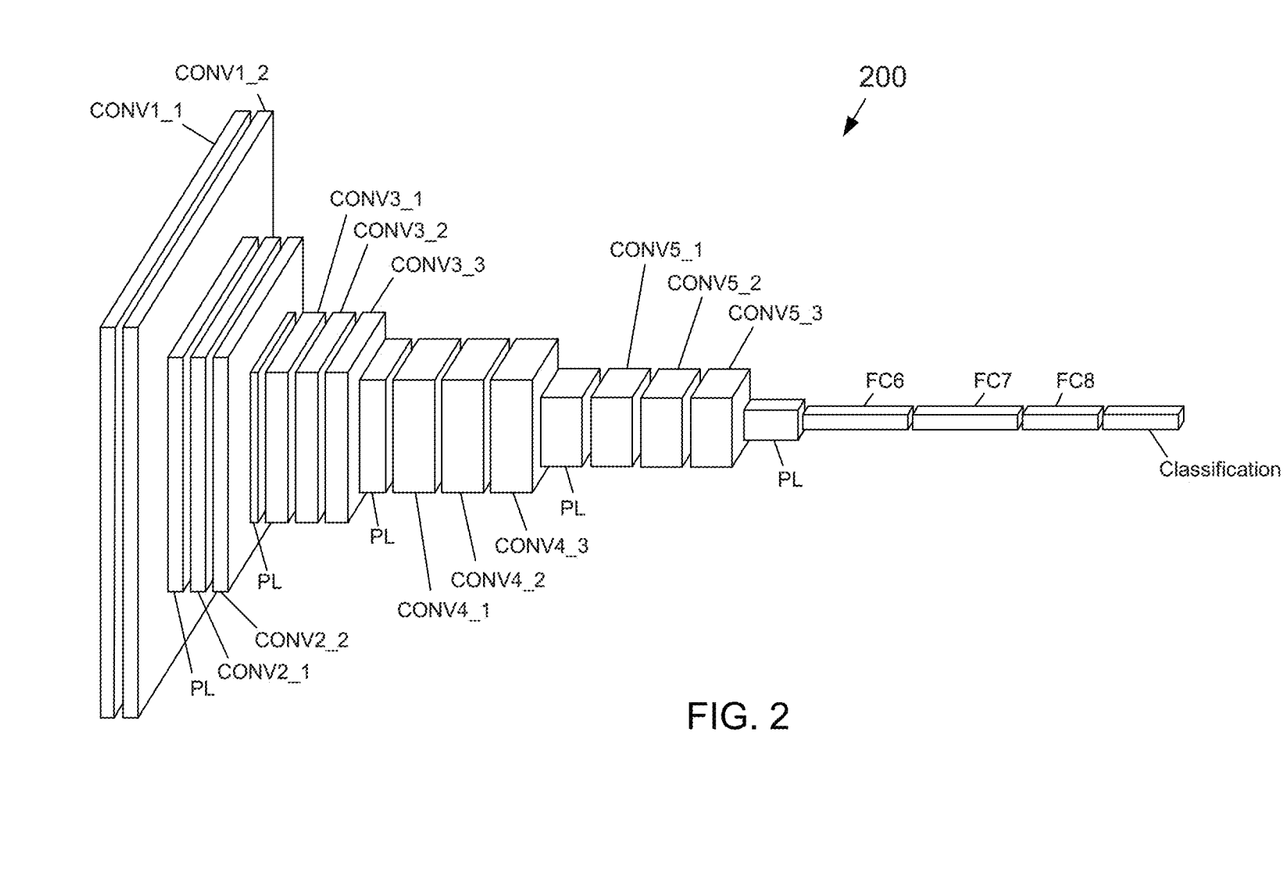
FIG. 2 depicts the architecture of a VGG 16 DNN.

In one embodiment, the example layer 100 may be part of a DNN having, for example, the architecture 200 of the VGG 16 DNN depicted in FIG. 2. The architecture 200 of the VGG 16 specifically includes 13 convolutional (CONV) layers, three fully connected (FC) layers, and five pooling layers (PLs). An input to the VGG 16 architecture 200 is applied to convolutional layer CONV1_1, and an output is provided at Classification.

Referring back to FIG. 1, as disclosed herein, an analytic threshold function h(w) may be applied to the weights w of layer 100 at 101 to form a weight function f(w) that replaces the weights w, thereby forming a layer 100'. In one embodiment, each weight w may be multiplied by the analytic function h(w). A graph of an example weight function f(w) is shown at the top center of FIG. 1.

The threshold function h(w) may be generally characterized as having the qualities of setting the values of weights that have magnitudes less than a threshold to zero without affecting the values of weights having magnitude greater than the threshold. In one embodiment, the threshold function h(w) may be $$h(w) = \frac{1}{1 + e^{-\beta^2 w^2 / \alpha^2}}, \quad (1)$$

in which α is a parameter that controls a sharpness of the threshold function h(w), and β is a parameter that controls a distance between the first and second edges.

Figure 3A:
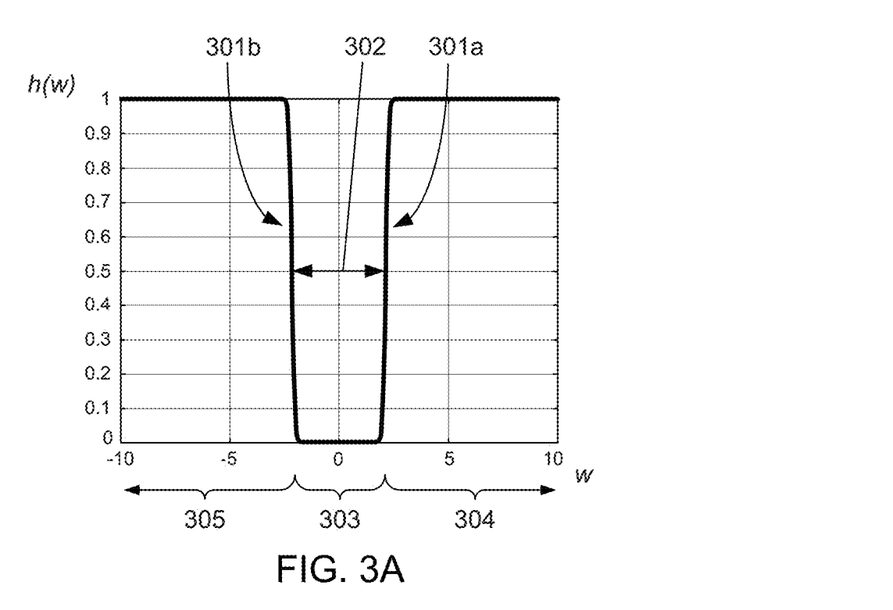
FIG. 3A depicts a graph of the example threshold function according to the subject matter disclosed herein.

FIG. 3A depicts a graph of the example threshold function of Eq. (1). The parameter α in Eq. (1) controls a sharpness of the edges 301a and 301b of the threshold function h(w), that is, the parameter α controls a rate of change of the edges 301a and 301b between h(w)=0 and h(w)=1. The parameter β in Eq. (1) controls a width 302 between the two edges 301a and 301b at h(w)=0.5.

As depicted in FIG. 3A, the threshold function h(w) has a value of 0 for a first set 303 of continuous weight values that are centered around 0. Additionally, the threshold function h(w) has a value of 1 for a second set 304 of continuous weight values that are greater than the first set 303 of continuous weight values, and has a value of 1 for a third set 305 of continuous weight values that are less than the first set 303 of weight values. The first edge 301a of the threshold function h(w) is between the first set 303 of continuous weight values and the second set 304 of continuous weight values. The second edge 301b is between the first set 303 of continuous weight values and the third set 305 of continuous weight values. The values of the threshold function h(w) transition between 0 and 1 in the regions of the first and second edges 301a and 301b. A sharpness of each of the first and second edges 301a and 301b as the threshold function h(w) transitions between 0 and 1 is based on a value of the parameter α (i.e., the sharpness of the edges 301a and 301b of the threshold function h(w)) and a distance 302 between the first and second edges 301a and 301b at h(w)=0.5 is based on a value of the parameter β.

In one embodiment, each of the weights of a layer may be multiplied by the threshold function h(w) to form the weight function f(w) as, $$f(w) = \frac{w}{1 + e^{-\beta^2 w^2 / \alpha^2}}. \quad (2)$$

Figure 3B:
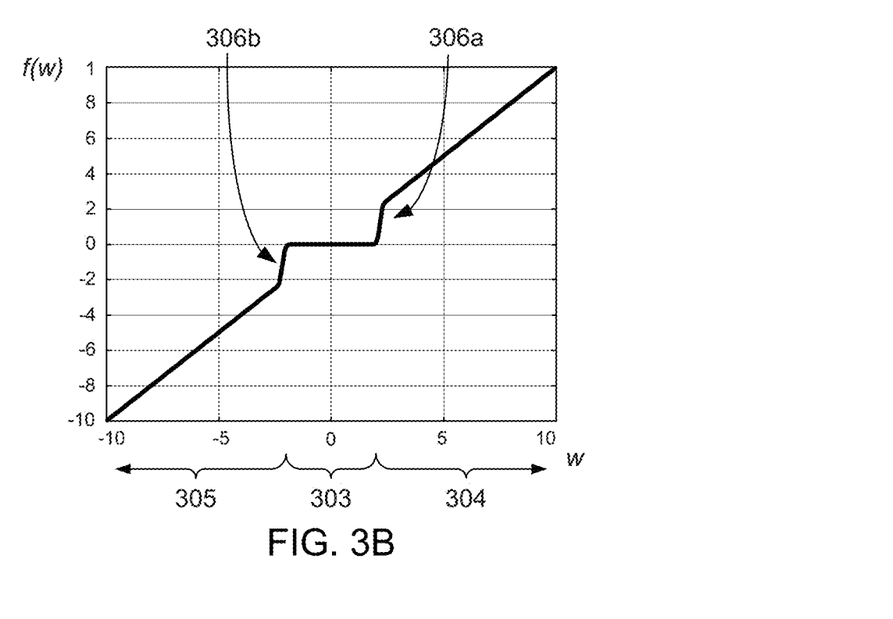
FIG. 3B depicts a graph of an example weight function f(w) according to the subject matter disclosed herein.

FIG. 3B depicts a graph of the weight function f(w) of Eq. (2). The weight function f(w) is also shown at the top center of FIG. 1. For the first set 303 of weight values, the weight function f(w) has a value of 0. The weight function f(w) has a value of w for the second set 304 of continuous weight values that are greater than the first set 303 of continuous weight values, and has a value of w for the third set 305 of continuous weight values that are less than the first set 303 of weight values. The weight function f(w) includes transition regions 306a and 306b that respectively correspond to the first edge 301a and the second edge 301b. As the value of the parameter a becomes smaller, the first and second edges 301a and 301b become sharper, and the transition regions 306a and 306b become smaller in the w direction.

Figure 4A:
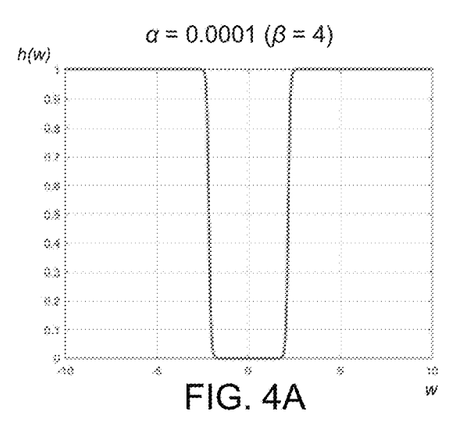
FIGS. 4A, 4B, 4C, 4D, 4E and 4F depict six example graphs of an example threshold function h(w) with different values for the parameters $\alpha$ and $\beta$ according to the subject matter disclosed herein.
Figure 4B:
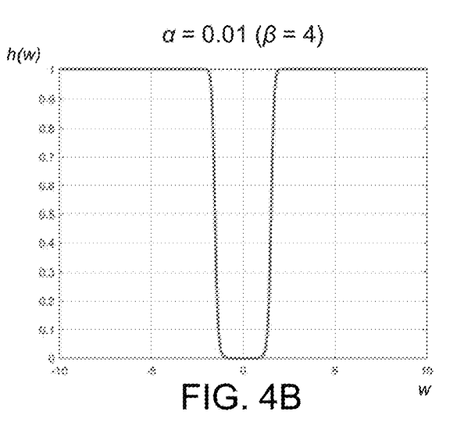
Figure 4C:
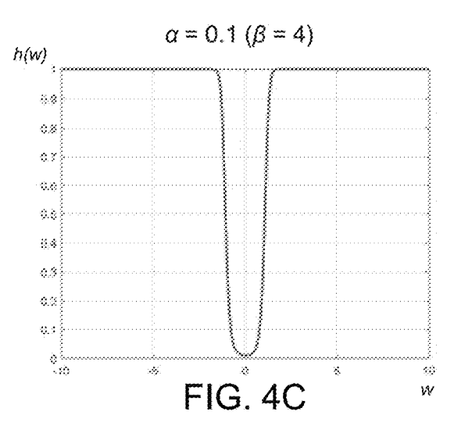
Figure 4D:
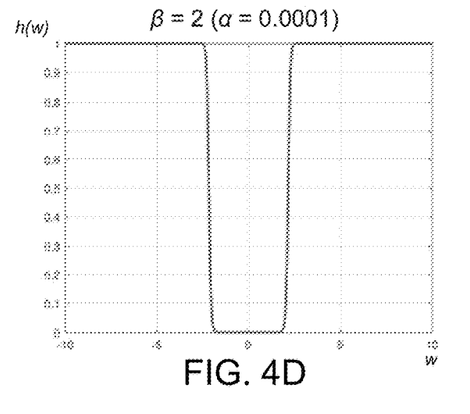
Figure 4E:
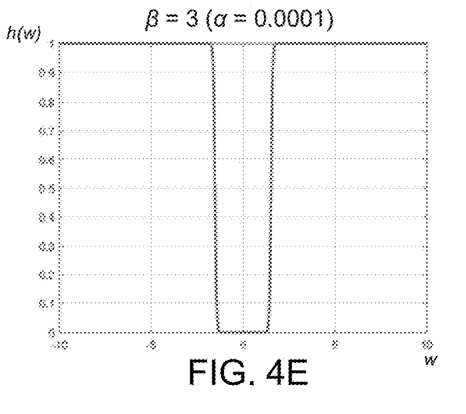
Figure 4F:
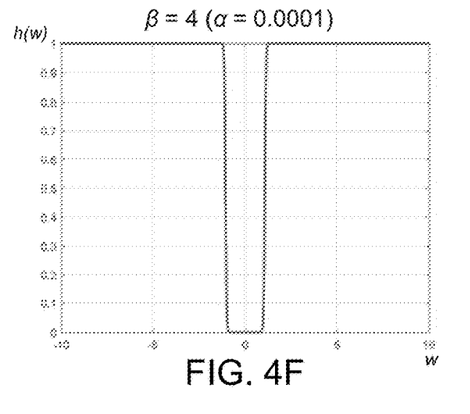

FIGS. 4A-4F depict six example graphs of the threshold function h(w) of Eq. (1) with different values for the parameters α and β to provide a visual sense for how the parameters α and β may affect the threshold function h(w) and the weight function f(w). In FIG. 4A-4C, the parameter α is varied from α=0.0001 (FIG. 4A) to α=0.1 (FIG. 4C), while the parameter β is constant at β=4. As can be seen in FIGS. 4A-4C, the smaller the value of α, the sharper the threshold function h(w) transitions between 0 and 1. In FIGS. 4D-4F, the parameter β is varied from β=2 (FIG. 4D) to β=4 (FIG. 4F), while the parameter α is constant at α=0.0001. From FIGS. 4D-4F, it can be seen that the smaller the parameter β, the greater the width between the edges of the threshold function h(w) at h(w)=0.5. Thus, smaller values of the parameters α and β provide a more robust threshold and a wider width for the threshold function h(w), which in turn provides a relatively greater number of zero weights or, in other words, relatively fewer non-zero weights.

Figure 5A:
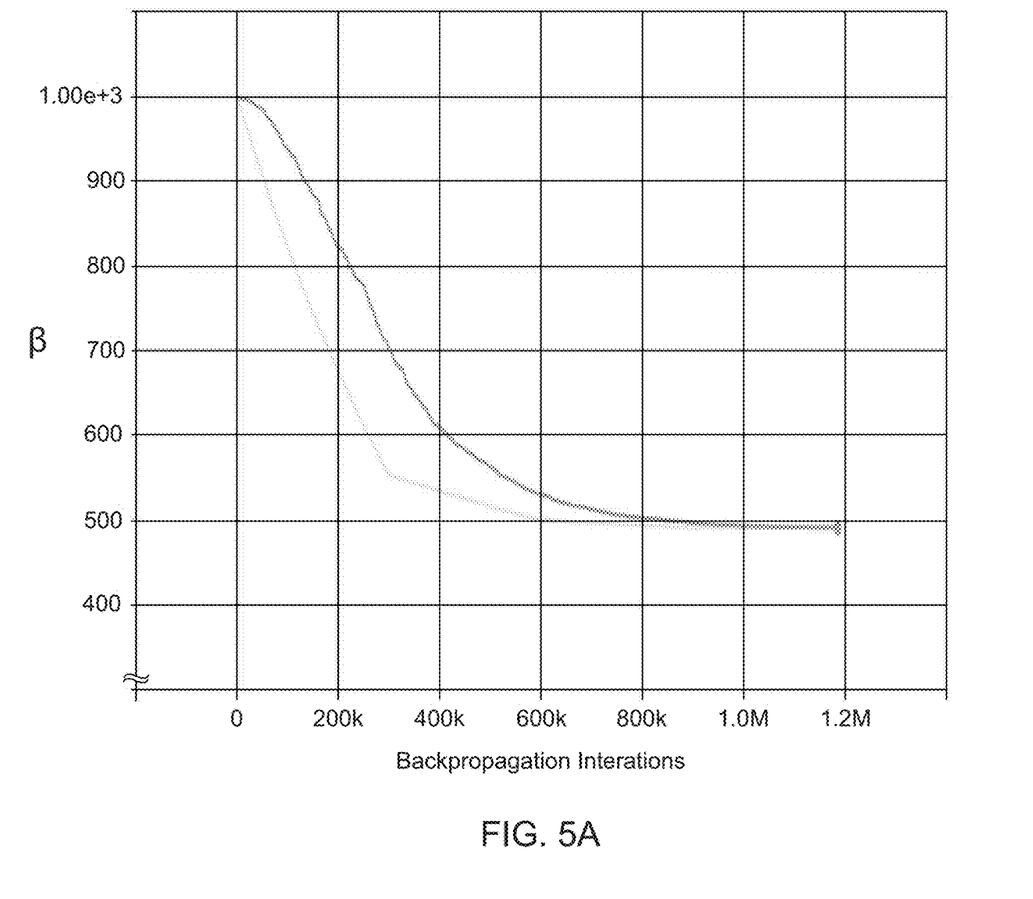
FIGS. 5A and 5B respectively depict how training and repeated back-propagation may optimize the parameter $\beta$ and the convergence of the threshold function h(w) as the parameter $\beta$ is optimized according to the subject matter disclosed herein.
Figure 5B:
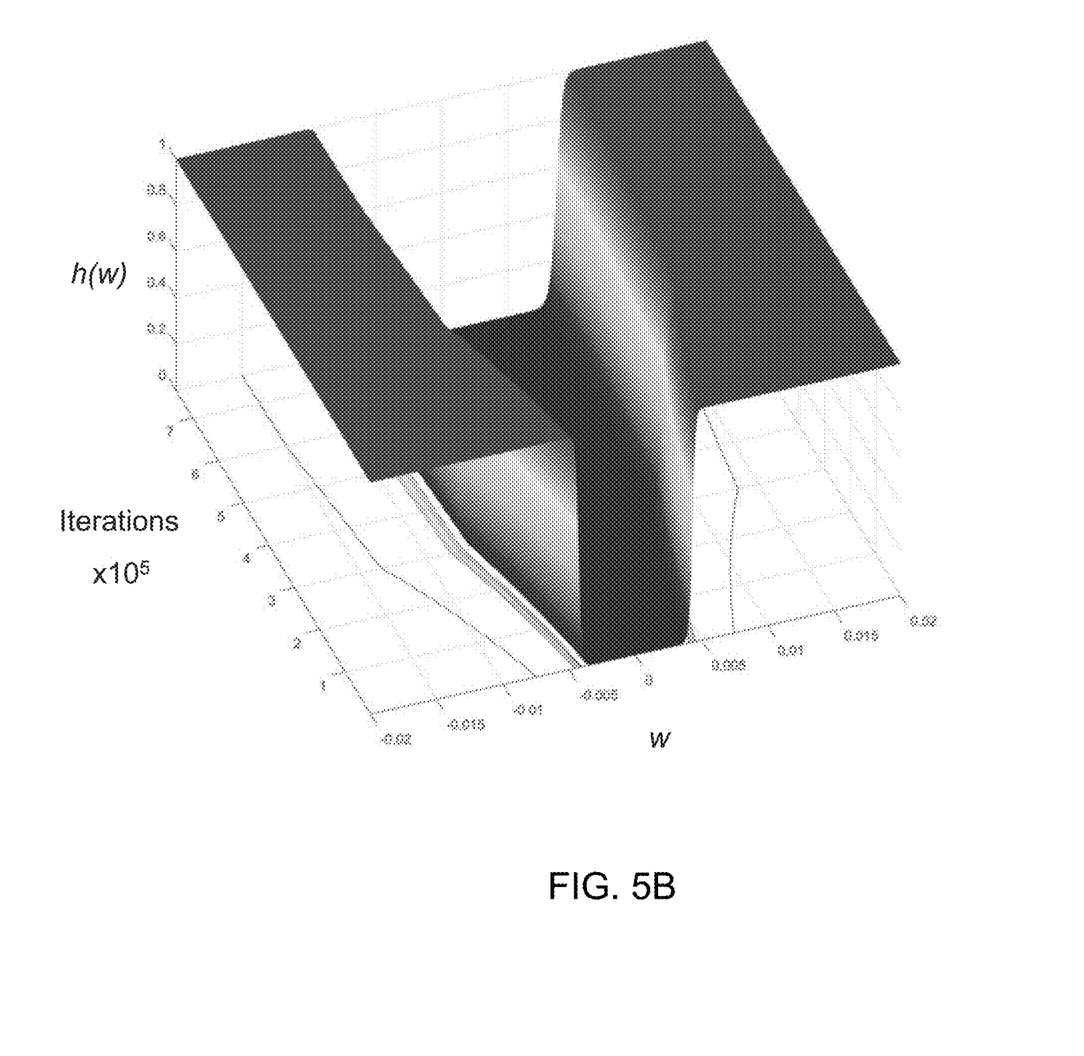

The parameters α and β in the threshold function h(w) are trainable and may be optimized during back-propagation of the output of a DNN back to the input. FIGS. 5A and 5B respectively depict how training and repeated back-propagation may optimize the parameter β and the convergence of the threshold function h(w) as the parameter β is optimized according to the subject matter disclosed herein. The curve in FIG. 5A show the parameter b converging to an optimal value. The parameter β has no units because it is a scaling value. In FIG. 5B, as the iterations of training and back-propagation increase and the parameter β become optimized, the shape of the threshold function h(w) converges to have optimally sharp edges and an optimal spacing at h(w)=5.

Thus, the trainability of the parameters α and β provides a significant advantage over other pruning techniques that rely on iterative pruning and re-training because using the threshold function h(w) results in the number of non-zero weights being automatically optimized during back-propagation instead of empirically selecting thresholds to eventually arrive at an acceptable number of non-zero weights in the different layers of a DNN. Optimally reducing the number of non-zero weights, in turn, optimally reduces the computational burden on a device running the DNN. By reducing the computational burden, devices running a DNN optimized by the trainable weight pruning techniques disclosed herein run faster and consume less power because the DNN includes fewer multiply and accumulate (MAC) operations than if a different weight pruning technique was used to optimize the DNN.

To incorporate updates of the parameters α and β during a back-propagation operation, an overall cost function C that may be minimized to optimize the DNN may be $$C = 1/2 \Sigma_j (z_j^{(L)} - y_i)^2 + 1/2 \lambda_1 \alpha^2 + 1/2 \lambda_2 \beta^2, \quad (3)$$

in which C is the overall cost to be minimized, L the number of layers, j the index of weights in a final layer L, $\lambda_1$ and $\lambda_2$ are regularization parameters for minimizing the values of α and β, z is a prediction, and y is a ground truth.

One of the objectives of minimizing Eq. (3), the overall cost function C, is to find a set of weights that provide a minimal difference between the prediction (the output) and the ground truth, and minimal values for the parameters α and β such that the threshold function f(w) has the qualities of sharp edges and a wide width.

The parameters α and β may be optimized using a Gradient Descent technique. The weights may be updated as $$\Delta w \approx -\frac{\partial C}{\partial f(w)} \frac{\partial f(w)}{\partial w}, \quad (4)$$

in which Δw represents a change in a current value of the w. The parameters α and β in f(w) may be updated as $$\Delta \alpha \approx -\sum_j \frac{\partial C}{\partial f(w_j)} \frac{\partial f(w_j)}{\partial \alpha} - \lambda_1 \alpha \quad (5)$$

and $$\Delta \beta \approx -\sum_j \frac{\partial C}{\partial f(w_j)} \frac{\partial f(w_j)}{\partial \beta} - \lambda_2 \beta. \quad (6)$$

in which Δα represents a change in a current value of the parameter α, and Δβ represents a change in a current value of the parameter β.

It may be shown that values for the weights w and the function parameters a and β may be found such that the cost function C resides in a local minimum. The regularization terms for α and β applies a soft constrain on the parameters α and β to have small values. The regularization terms for α and β may be empirically selected. Furthermore, to limit α and β to positive values, a hard positivity constrain may be applied using convex projections.

Once the training is complete, the values of the weight function f(w) are saved instead of weight values w, thereby saving time and computing cost at the inference time because f(w) does not need to be calculated and f(w) values have high sparsity with fewer non-zero values than w.

Initial values of the parameters α and β may be selected to improve the training and back-propagation training of the parameters α and β. In one embodiment, the initial values of the parameters α and β may be selected by solving the Eq. (7).

$$\frac{\partial^2 h(w)}{\partial w^2} = 0 \quad (7)$$

Figure 6:
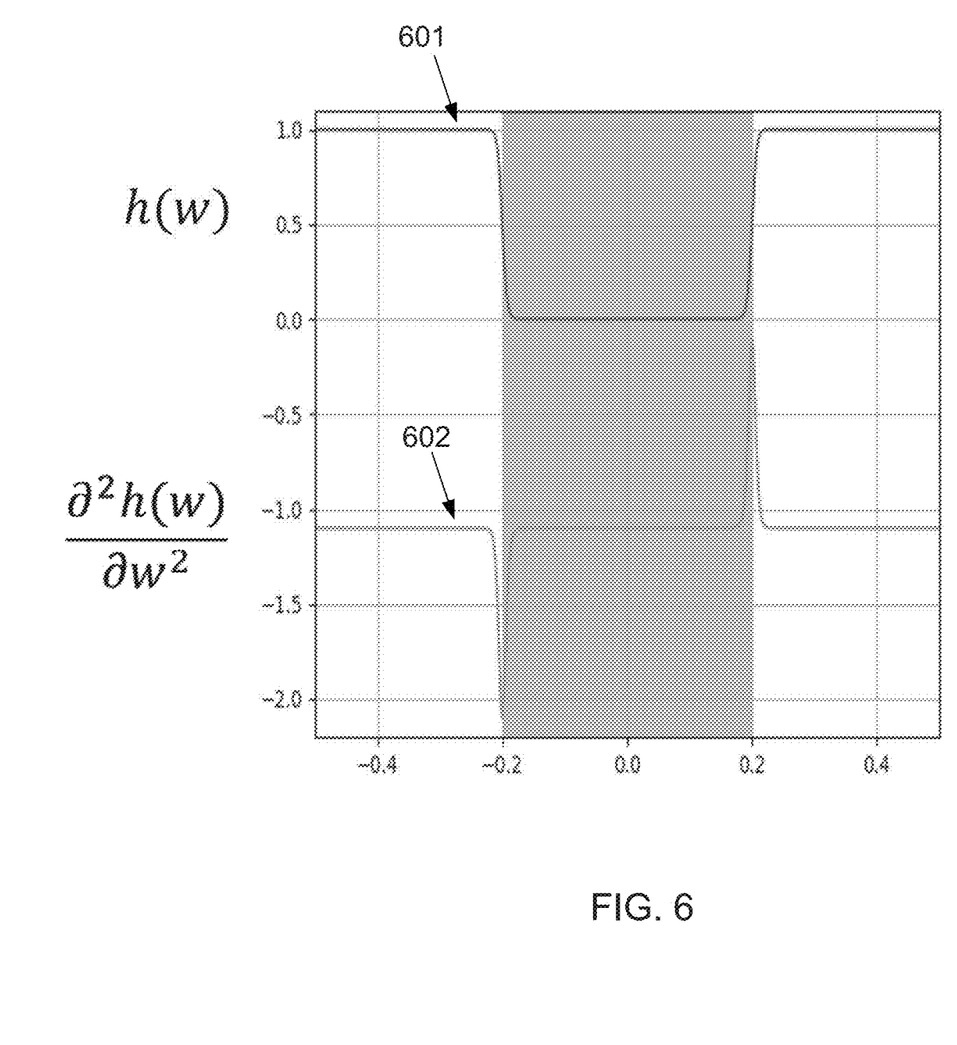
FIG. 6 depicts an example threshold function h(w) and the second derivative of the example threshold function h(w) according to the subject matter disclosed herein.

FIG. 6 depicts an example threshold function h(w) at 601 and the second derivative of h(w) at 602. The gray-shaded region in FIG. 6 corresponds to the first set 303 of continuous weight values that are centered around 0 indicated in FIG. 3A.

Figure 7:
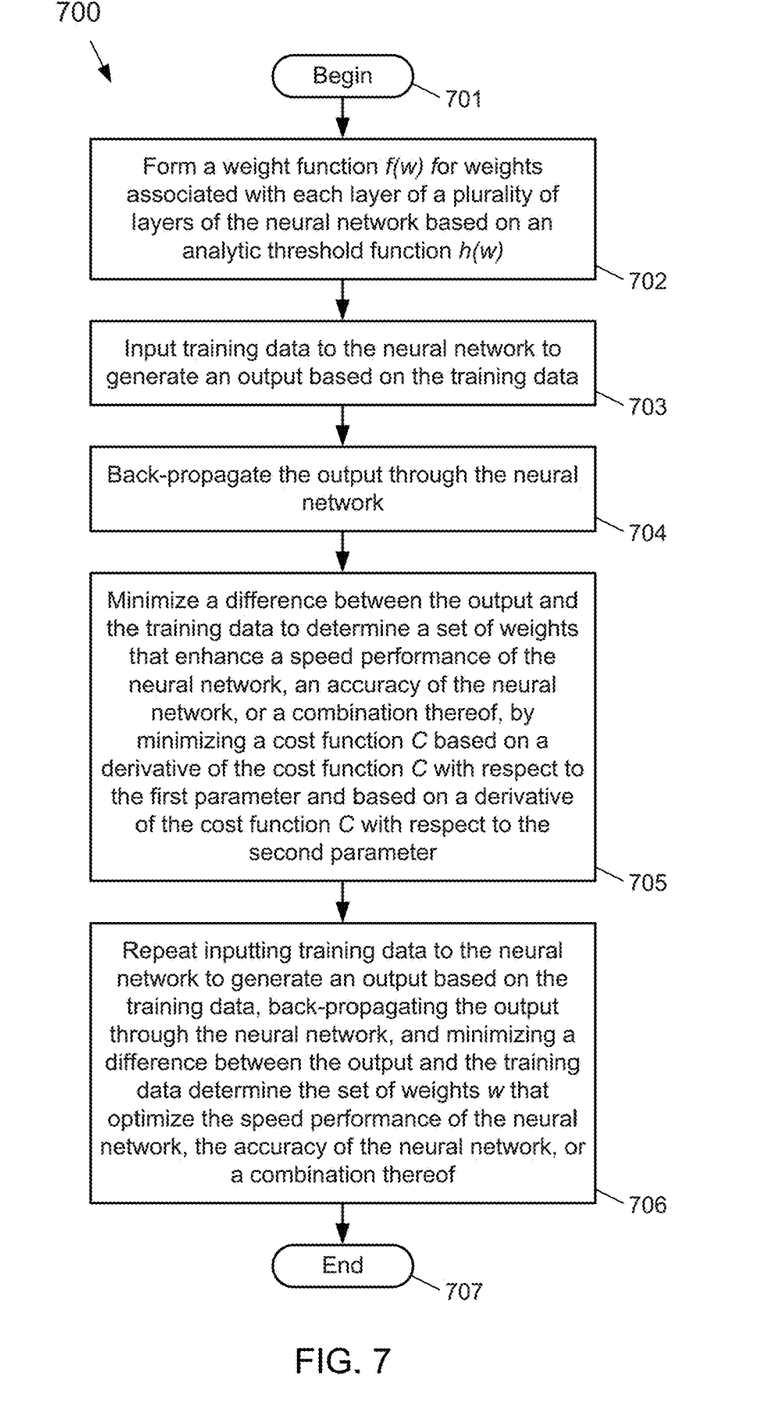
FIG. 7 depicts a flow diagram of an example method to prune weights of a neural network according to the subject matter disclosed herein.

FIG. 7 depicts a flow diagram of an example method 700 to prune weights of a neural network according to the subject matter disclosed herein. At 701, the method begins. At 702, a weight function f(w) is formed for weights w associated with each layer of a plurality of layers of the neural network based on an analytic threshold function h(w). In one embodiment, each weight w is multiplied by the analytic threshold function h(w) to form the weight function f(w). At 703, training data is input to the neural network to generate an output based on the training data. At 704, the output is back-propagated through the neural network. At 705, a difference between the output and the training data is minimized to determine a set of weights w that enhance a speed performance of the neural network, an accuracy of the neural network, or a combination thereof, by minimizing a cost function C based on a derivative of the cost function C with respect to first parameter α of the threshold function h(w) and based on a derivative of the cost function C with respect to a second parameter β of the threshold function h(w). At 706, inputting training data to the neural network to generate an output based on the training data, back-propagating the output through the neural network, and minimizing a difference between the output and the training data are done repeatedly to determine the set of weights w that optimize the speed performance of the neural network, the accuracy of the neural network, or a combination thereof. At 707, the process ends.

Figure 8:
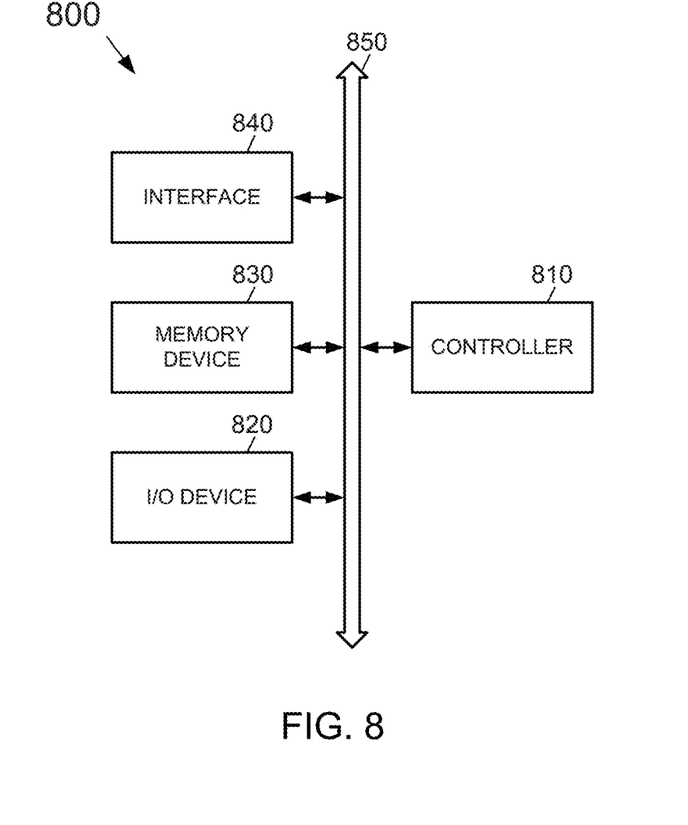
FIG. 8 depicts an electronic device that includes a neural network that has weights that have been pruned using a threshold function h(w) according to the subject matter disclosed herein.

FIG. 8 depicts an electronic device 800 that includes a neural network that has weights that have been pruned using a threshold function h(w) according to the subject matter disclosed herein. Electronic device 800 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 800 may include a controller 810, an input/output device 820 such as, but not limited to, a keypad, a keyboard, a display, a touch-screen display, a camera, and/or an image sensor, a memory 830, and an interface 840 that are coupled to each other through a bus 850. The controller 810 may include, for example, at least one microprocessor, at least one digital signal process, at least one microcontroller, or the like. The memory 830 may be configured to store a command code to be used by the controller 810 or a user data. Electronic device 800 and the various system components of electronic device 800 may form a system that provides a neural network that has weights that have been prune using a threshold function h(w) according to the subject matter disclosed herein. The interface 840 may be configured to include a wireless interface that is configured to transmit data to or receive data from a wireless communication network using a RF signal. The wireless interface 840 may include, for example, an antenna, a wireless transceiver and so on. The electronic system 800 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), and so forth.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices).

The operations described in this specification may be implemented as operations performed by a data-processing apparatus on data stored on one or more computer-readable storage devices or received from other sources.

The term "data-processing apparatus" encompasses all kinds of apparatus, devices and machines for processing data, including by way of example, a programmable processor, a computer, a system on a chip, or multiple ones, or combinations, of the foregoing The apparatus may include special-purpose logic circuitry, e.g., an FPGA (field programmable gate array) or an ASIC (application-specific integrated circuit). The apparatus may also include, in addition to hardware, code that creates an execution environment for the computer program, e.g., code that constitutes processor firmware, a protocol stack, a database-management system, an operating system, a cross-platform runtime environment, a virtual machine, or a combination thereof. The apparatus and execution environment may realize various different computing model infrastructures, such as web services, distributed computing and grid computing infrastructures.

A computer program (also known as a program, software, software application, script, or code) may be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus can also be implemented as, special-purpose logic circuitry, e.g., an FPGA (field programmable gate array) or an ASIC (application-specific integrated circuit).

Processors suitable for the execution of a computer program include, by way of example, both general-purpose and special-purpose microprocessors, and any one or more processors of any kind of digital computer. Generally, a processor may receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. A computer, however, need not have such devices. Moreover, a computer may be embedded in another device, e.g., a mobile telephone, a personal-digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special-purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, with which the user can provide input to the computer. Other kinds of devices can be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back-end component, e.g., as a data server, or that includes a middleware component, e.g., an application server, or that includes a front-end component, e.g., a user computer having a graphical user interface or a Web browser through which a user may interact with an implementation of the subject matter described in this specification, or any combination of one or more such back-end, middleware, or front-end components. The components of the system may be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system may include users and servers. A user and server are generally remote from each other and typically interact through a communication network. The relationship of user and server arises by virtue of computer programs running on the respective computers and having a user-server relationship to each other.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A data-processing device, comprising:
a processor; and
a memory,
the data-processing device being configured as a neural network comprising a plurality of layers, at least one layer of the plurality of layers comprising a convolutional layer, each layer of the plurality of layers comprising a set of weights w associated with the layer that enhance a speed performance of the neural network, an accuracy of the neural network, or a combination thereof, each set of weights being pruned using an analytic threshold function h(w), the analytic threshold function h(w) comprising a first predetermined value for a first set of continuous weight values centered around 0, and a second predetermined value for a second set of continuous weight values and for a third set of continuous weight values, the first predetermined value being different from the second predetermined value, the second set of continuous weight values being different from and greater than the first set of continuous weight values and the third set of continuous weight values being different from and less than the first set of continuous weight values, when graphed the analytic threshold function h(w) comprising a first parameter that sets a sharpness characteristic of a first edge and of a second edge of the analytic threshold function h(w) between the first predetermined value and the second predetermined value, and a second parameter that sets a distance between the first edge and the second edge of the analytic threshold function h(w); and
the processor being configured to:
determine the neural network is trained based on each set of the weights being pruned; and
perform an inference operation using the trained neural network.

2. The data-processing device of claim 1, wherein the first predetermined value equals 0 and the second predetermined value equals 1.

3. The data-processing device of claim 1, wherein the analytic threshold function h(w) further comprising a first edge between the first set of continuous weight values and the second set of continuous weight values and a second edge between the first set of continuous weight values and the third set of continuous weight values, the sharpness characteristic of the first edge and of the second edge between the first predetermined value and the second predetermined value being based on a value of the first parameter of the analytic threshold function h(w) and the distance between the first and second edges being based on a value of the second parameter of the analytic threshold function h(w).

4. The data-processing device of claim 3, wherein the analytic threshold function h(w) is proportional to β and inversely proportional to α, in which α is the first parameter, and β is the second parameter.

5. The data-processing device of claim 4, wherein an initial value for the first parameter α and an initial value for the second parameter β is based on a partial second derivative of the analytic threshold function h(w) with respect to w being equal to zero.

6. The data-processing device of claim 5, wherein the first parameter α and the second parameter β for each set of weights is based on:
a cost function C that is minimized by back-propagating an output of the neural network in response to input training data, the cost function C being based on a number of layers, an index of weights in a final layer and one or more regularization parameters,
a derivative of the cost function C with respect to a first parameter of the analytic threshold function h(w), and
a derivative of the cost function C with respect to a second parameter of the analytic threshold function h(w).

7. The data-processing device of claim 6, wherein the cost function C is minimized based on the derivative of the cost function C with respect to the first parameter α by updating the first parameter α during back-propagating the output through the neural network, and
wherein the cost function C is minimized based on the derivative of the cost function C with respect to the second parameter β by updating the second parameter β during back-propagating the output through the neural network.

8. The data-processing device of claim 7, wherein the cost function C is further minimized by updating values for weights w of each set of weights during back-propagating the output through the neural network.

9. The data-processing device of claim 1, wherein the neural network comprises a deep neural network.

10. A method to prune weights of a neural network, the method comprising:
forming a weight function f(w) for weights w associated with each layer of a plurality of layers of the neural network based on an analytic threshold function h(w), the analytic threshold function h(w) comprising a first predetermined value for a first set of continuous weight values centered around 0, and a second predetermined value for a second set of continuous weight values and for a third set of continuous weight values, the first predetermined value being different from the second predetermined value, the second set of continuous weight values being different from and greater than the first set of continuous weight values and the third set of continuous weight values being different from and less than the first set of continuous weight values, when graphed the analytic threshold function h(w) further comprising a first edge between the first set of continuous weight values and the second set of continuous weight values and a second edge between the first set of continuous weight values and the third set of continuous weight values, a sharpness characteristic of each of the first and second edges between the first predetermined value and the second predetermined value being based on a value of a first parameter of the analytic threshold function h(w) and a distance between the first and second edges being based on a value of a second parameter of the analytic threshold function h(w);
inputting training data to the neural network to generate an output based on the training data;
back-propagating the output through the neural network; and
minimizing a difference between the output and the training data to determine a set of weights w that enhance a speed performance of the neural network, an accuracy of the neural network, or a combination thereof, by minimizing a cost function C based on a derivative of the cost function C with respect to the first parameter and based on a derivative of the cost function C with respect to the second parameter;
determining the neural network is trained based on minimizing the difference between the output and the training data; and
performing an inference operation using the trained neural network.

11. The method of claim 10, wherein the analytic threshold function h(w) is proportional to β and inversely proportional to α, in which α is the first parameter, and β is the second parameter.

12. The method of claim 11, further comprising initializing the first parameter α and the second parameter β based on a partial second derivative of the analytic threshold function h(w) with respect to w being equal to zero.

13. The method of claim 11, wherein the weight function f(w) comprises weights of the neural network multiplied by the analytic threshold function h(w).

14. The method of claim 13, wherein the cost function C is based on a number of layers, an index of weights in a final layer and one or regularization parameters.

15. The method of claim 14, wherein minimizing the cost function C based on the derivative of the cost function C with respect to the first parameter α comprises updating the first parameter α during back-propagating the output through the neural network, and
wherein minimizing the cost function C based on the derivative of the cost function C with respect to the second parameter β comprises updating the second parameter β during back-propagating the output through the neural network.

16. The method of claim 15, wherein minimizing the cost function C further comprises updating values for weights w of each set of weights during back-propagating the output through the neural network.

17. The method of claim 16, wherein inputting training data to the neural network to generate an output based on the training data, back-propagating the output through the neural network, and minimizing a difference between the output and the training data are done repeatedly to determine each set of weights w that optimize the speed performance of the neural network, the accuracy of the neural network, or a combination thereof.

18. The method of claim 10, wherein the neural network comprises a deep neural network, and
wherein the first predetermined value equals 0 and the second predetermined value equals 1.

19. A data-processing device, comprising:
a processor; and
a memory,
the data-processing device being configured as a neural network comprising a plurality of layers, at least one layer of the plurality of layers comprising a convolutional layer, each layer of the plurality of layers comprising a set of weights w associated with the layer that enhance a speed performance of the neural network, an accuracy of the neural network, or a combination thereof, each set of weights being based on a cost function C that has been minimized by back-propagating an output of the neural network in response to input training data, on a derivative of the cost function C with respect to a first parameter of an analytic threshold function h(w) and on a derivative of the cost function C with respect to a second parameter of the analytic threshold function h(w), the analytic threshold function h(w) comprising a first predetermined value for a first set of continuous weight values centered around 0, and a second predetermined value for a second set of continuous weight values and for a third set of continuous weight values, the first predetermined value being different from the second predetermined value, the second set of continuous weight values being different from and greater than the first set of continuous weight values and the third set of continuous weight values being different from and less than the first set of continuous weight values, when graphed the analytic threshold function h(w) further comprising a first edge between the first set of continuous weight values and the second set of continuous weight values and a second edge between the first set of continuous weight values and the third set of continuous weight values, a sharpness characteristic of each of the first and second edges between the first predetermined value and the second predetermined value being based on a value of the first parameter of the analytic threshold function h(w) and a distance between the first and second edges being based on a value of the second parameter of the analytic threshold function h(w); and the processor being configured to:
  determine the neural network is trained based on back-propagating the output of the neural network in response to the input training data; and
  perform an inference operation using the trained neural network.

20. The data-processing device of claim 19, wherein the analytic threshold function h(w) is proportional to $\beta$ and inversely proportional to $\alpha$, in which $\alpha$ is the first parameter, and $\beta$ is the second parameter,
  wherein an initial value for the first parameter $\alpha$ and an initial value for the second parameter $\beta$ is based on a partial second derivative of the analytic threshold function h(w) with respect to w being equal to zero,
  wherein the cost function C is based on a number of layers, an index of weights in a final layer and one or regularization parameters, and
  wherein the first predetermined value equals 0 and the second predetermined value equals 1.

* * * * *